W. J. P. MOORE.
ELECTRICAL CONTROL MECHANISM FOR AUTOMOBILES AND OTHER VEHICLES AND MACHINES.
APPLICATION FILED MAR. 10, 1916. RENEWED MAR. 2, 1920.
1,337,613.
Patented Apr. 20, 1920.
5 SHEETS—SHEET 1.
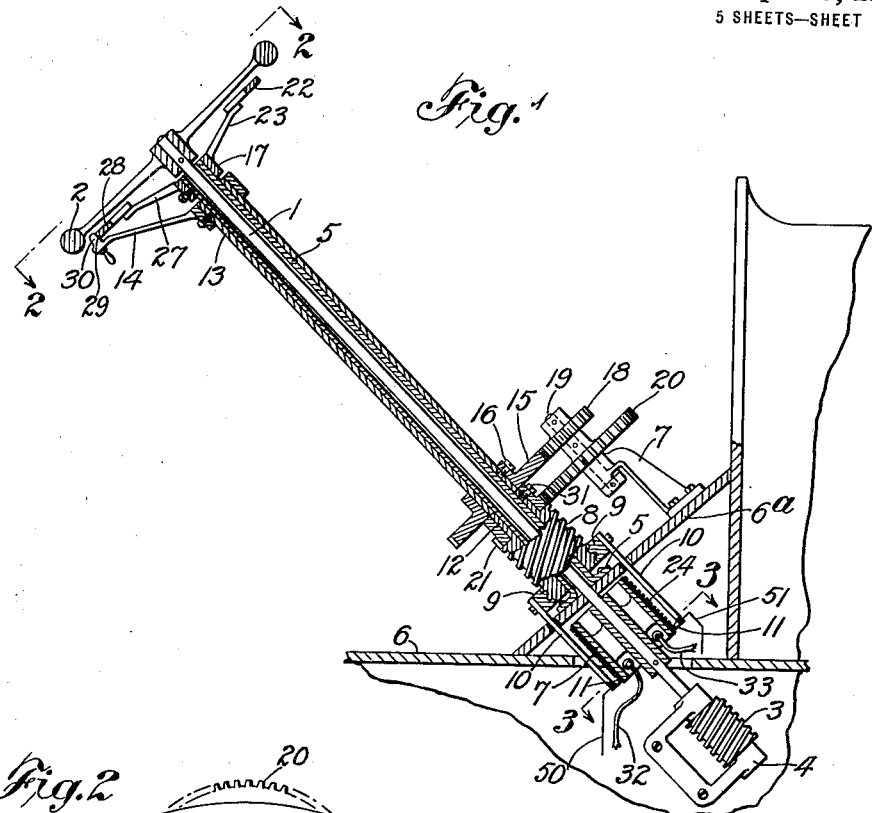
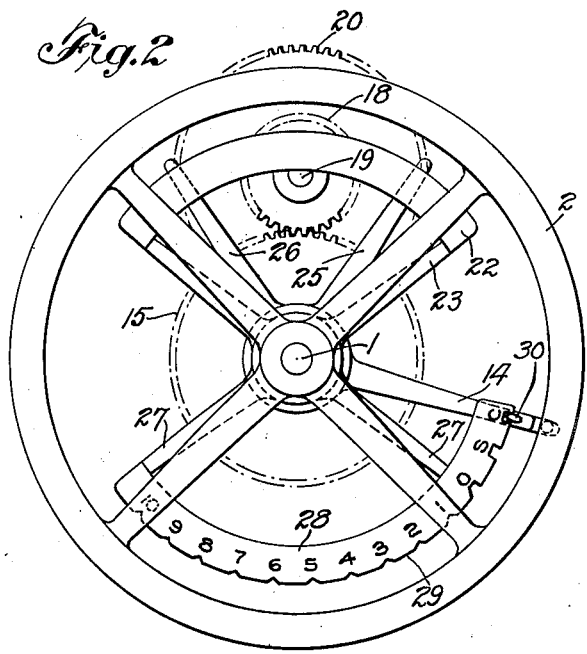
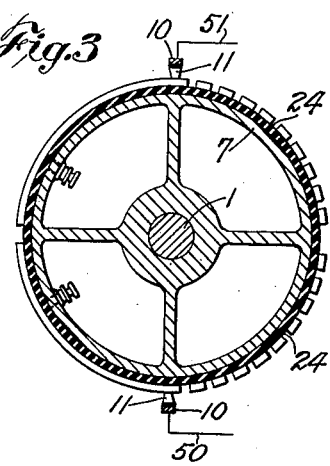
Inventor
William J. P. Moore
per Fred A. Walker
Atty.

W. J. P. MOORE.
ELECTRICAL CONTROL MECHANISM FOR AUTOMOBILES AND OTHER VEHICLES AND MACHINES.
APPLICATION FILED MAR. 10, 1916. RENEWED MAR. 2, 1920.
1,337,613.
Patented Apr. 20, 1920.
5 SHEETS—SHEET 2.
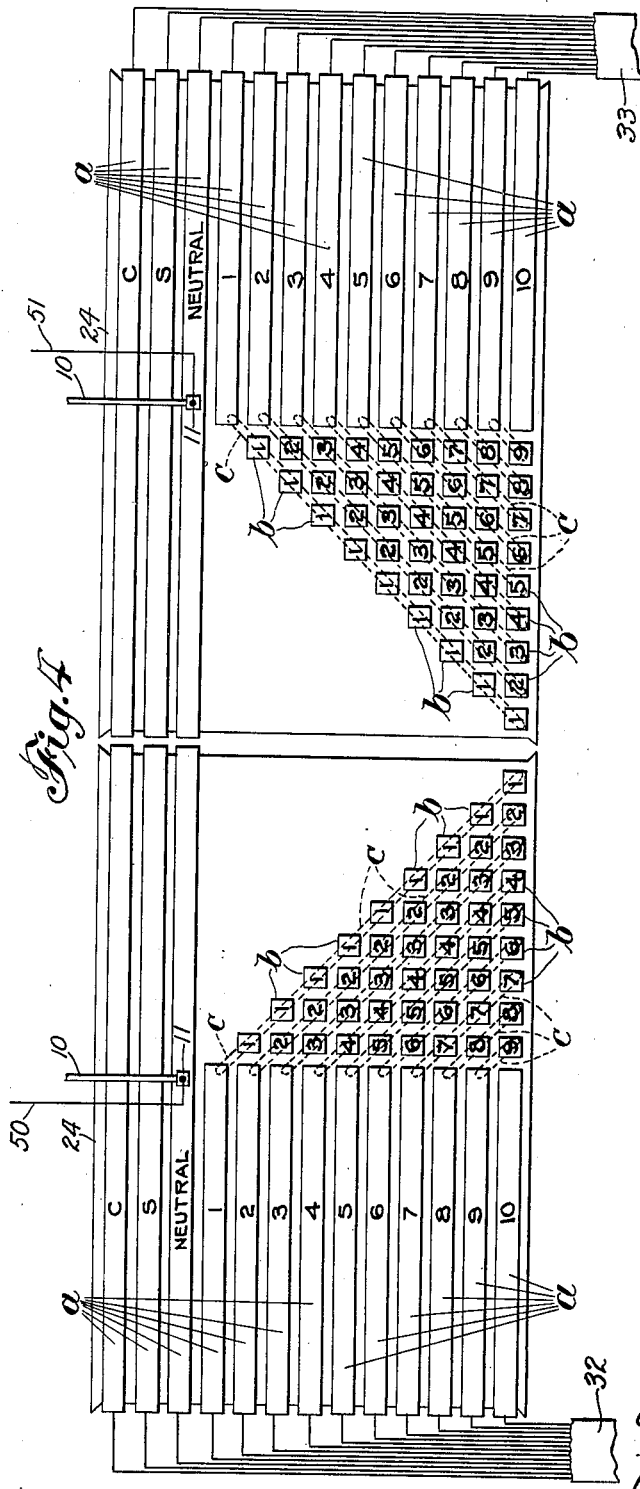

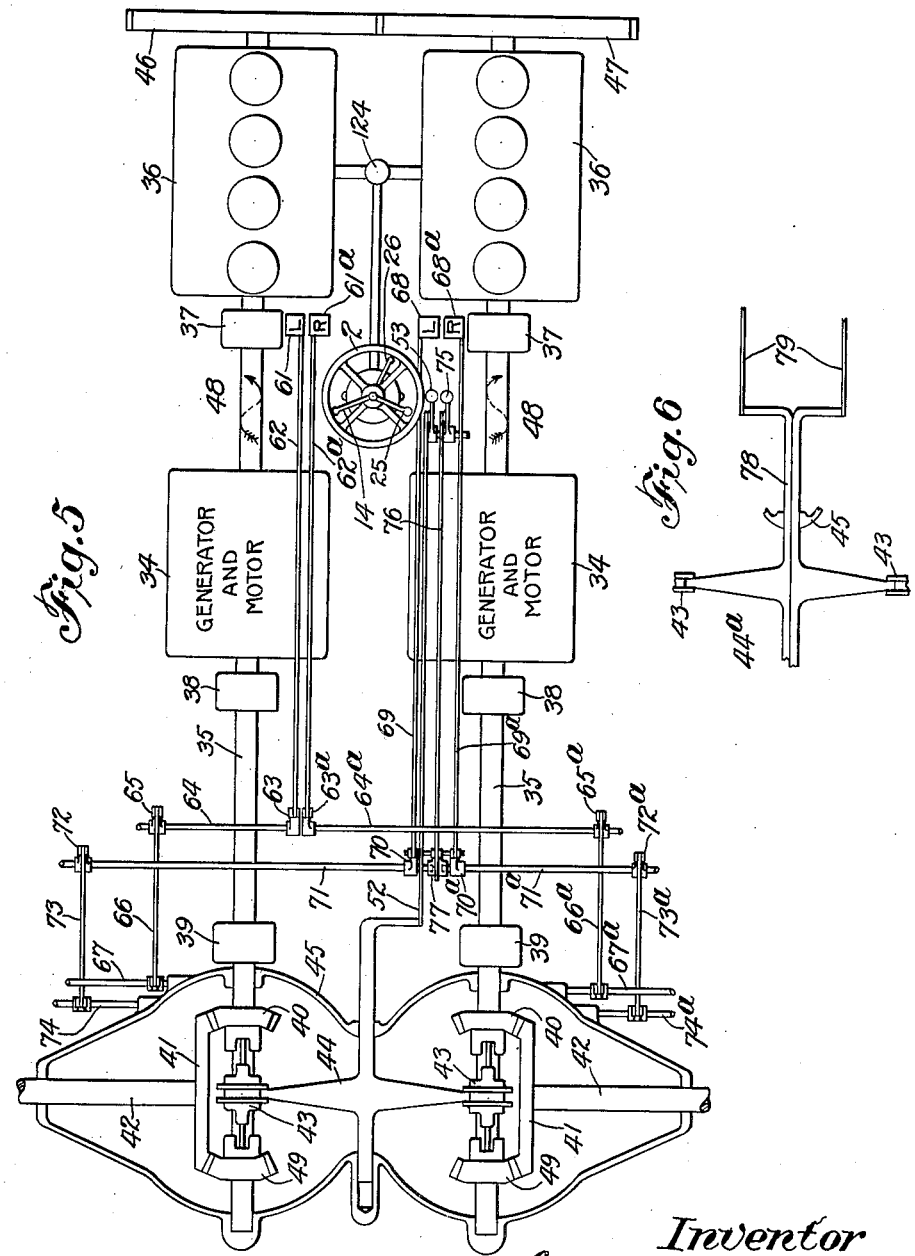

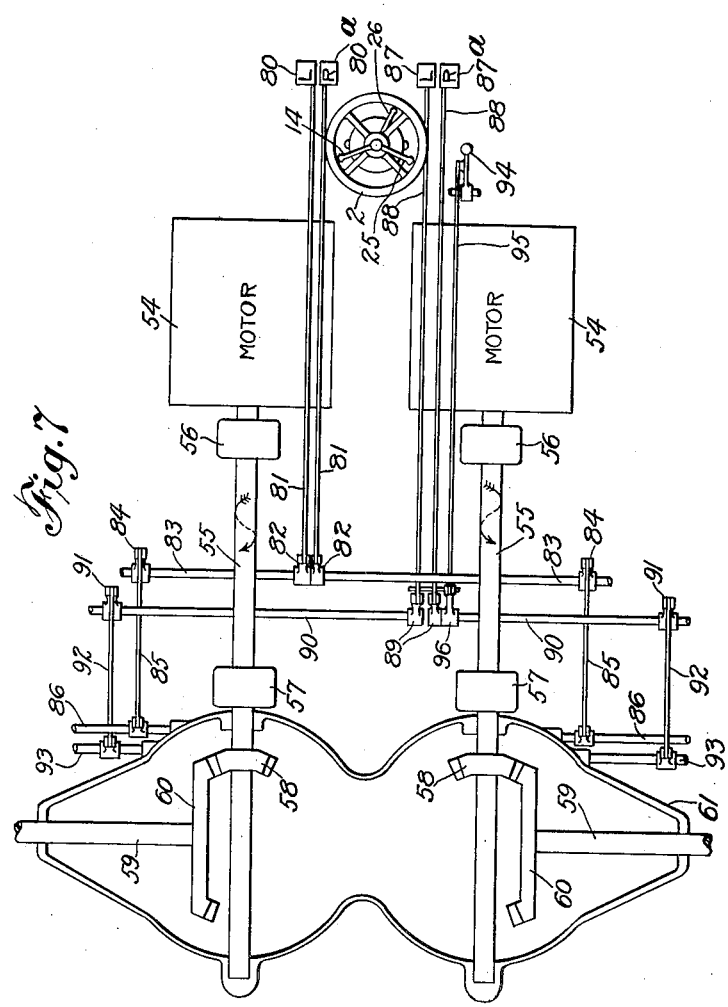

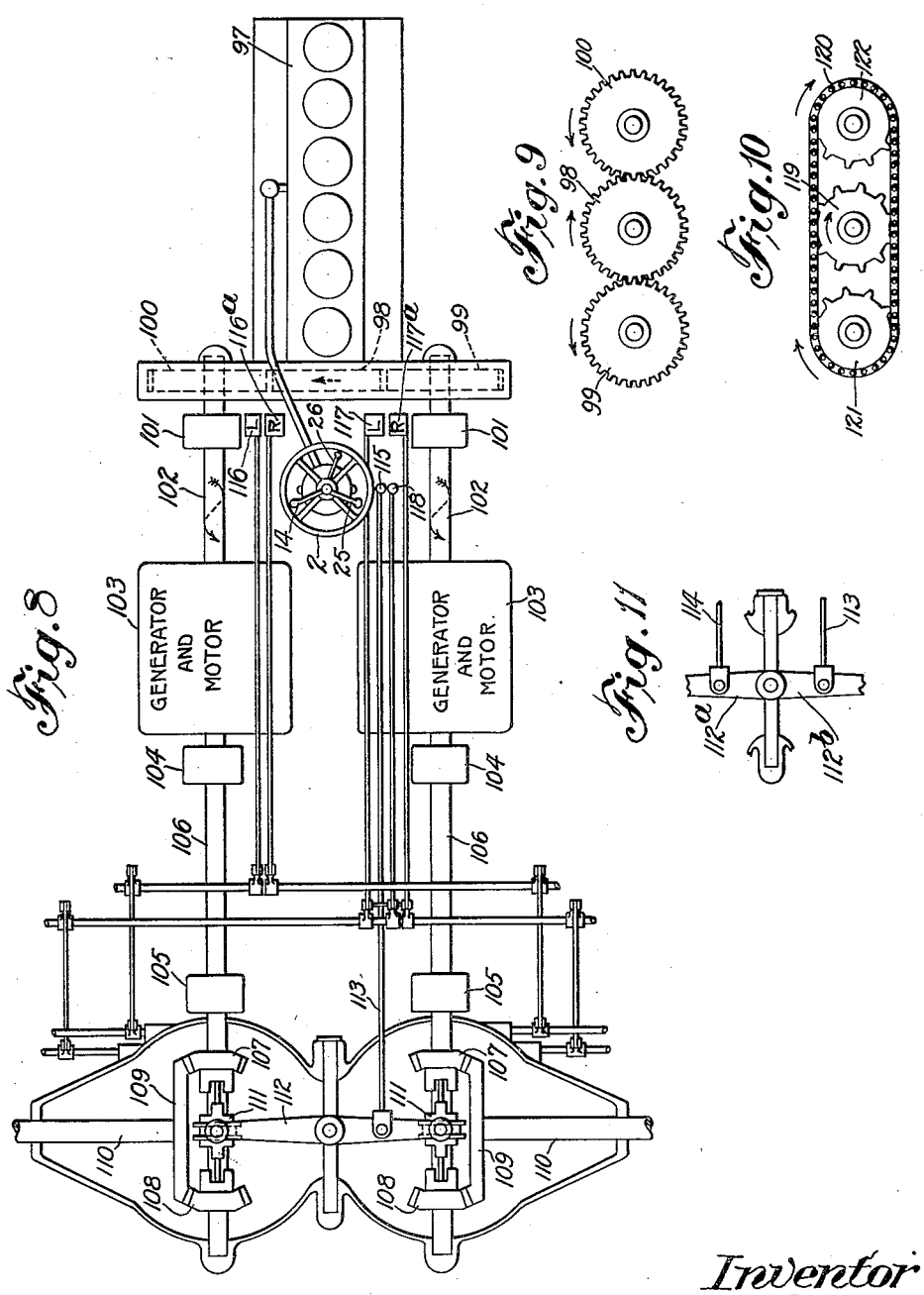

UNITED STATES PATENT OFFICE.

WILLIAM J. P. MOORE, OF NEW YORK, N. Y.

ELECTRICAL CONTROL MECHANISM FOR AUTOMOBILES AND OTHER VEHICLES AND MACHINES.

1,337,613.  Specification of Letters Patent.  Patented Apr. 20, 1920.

Application filed March 10, 1916, Serial No. 83,342. Renewed March 2, 1920. Serial No. 362,742.

*To all whom it may concern:*

Be it known that I, WILLIAM J. P. MOORE, a citizen of the United States, residing at New York, in the county of New York and State of New York, have invented certain new and useful Improvements in Electrical Control Mechanism for Automobiles and other Vehicles and Machines, of which the following is a specification, reference being had therein to the accompanying drawing.

My invention refers to means for controlling the operation of vehicles such as automobiles and the like, as well as other machines. The object is to provide means for independently driving two or more of the wheels and effectively controlling said drive so that the drive wheels may be positively and separately actuated by separate motive agencies, although jointly controlled; also to provide means whereby the independently driven wheels may be successfully availed of for steering purposes without the aid of any steering mechanism.

With these and other similar valuable aims and objects in view, the invention may be said to consist essentially in a twin drive for automobiles and other machines; a twin electric drive; a twin electric drive combined with twin motors for electric generation and jointly controlled so that the driving members may have the same speed or different speeds; a unitary control for a twin electric drive with innumerable speed reductions and an automatic differentiation of speed in the two driving units; a twin drive having in itself the steering function; and further the invention may be said to comprise various details and peculiarities in the construction, arrangement, and combination of the various parts, substantially as will be hereinafter described and then more particularly pointed out in the claims.

In the accompanying drawing illustrating my invention:

Figure 1 is a vertical section of a steering wheel and column with my improved electrical control devices arranged in connection therewith; certain parts being shown in side view.

Fig. 2 is a plan view of the top of the steering wheel and its appurtenances viewed in the direction shown by the arrows at 2, 2 in Fig. 1.

Fig. 3 is a transverse section on the line 3, 3 of Fig. 1.

Fig. 4 is a plan development of the portions of the face of the rotary drum and the groups of electrical contact points carried thereon and forming a part of the controlling mechanism, the same being laid out flat so as to more clearly indicate the position and arrangement of the parts.

Fig. 5 is a diagrammatic plan view of the driving mechanism of an automobile, including a pair of gas engines, a pair of parallel propelling shafts, electric generators and motors arranged in connection with said shafts, the drive shafts in connection with the rear axle, brake devices, and other parts.

Fig. 6 is a detail view of a modification in the means for shifting the clutch mechanism belonging to the axle drive shafts shown in Fig. 5.

Fig. 7 is a diagrammatic view showing an outline of the same parts when applied for use in conjunction with electric motors without the use of gasolene or other engines.

Fig. 8 is another similar diagrammatic view showing an outline plan of the same parts shown in Fig. 5 when connected for use in conjunction with a single internal combustion or other engine which is properly geared to the two parallel shafts to drive them in the same direction.

Fig. 9 is a detail front elevation of one form of gearing between the crank shaft of the single internal combustion engine and the two main drive shafts, said train of gearing being arranged so that the propeller shafts are driven both in the said direction, which is opposite to the direction of motion of the crank shaft of the engine.

Fig. 10 is a front elevation of a modified form of gear mechanism between the single engine and the shafts, the same consisting of sprocket wheels and a chain instead of a train of intermeshing gears, said sprocket wheels and chain causing the propeller shafts to both revolve in a direction the same as the engine crank shaft, which direction of motion is opposite to that of the outside gears in Fig. 9.

Fig. 11 is a detail view of a portion of the clutch operating devices shown in Fig. 8, and indicates a modified means for operating said mechanism.

Similar characters of reference designate corresponding parts throughout the different figures of the drawing.

1 designates a central inclined rod or shaft belonging to the front steering mechanism of an automobile or other vehicle, to the upper end of which is fastened a steering wheel 2 of the usual or any other type, said shaft 1 having on its lower end, beneath the car floor 6, a worm 3 which is designed to engage with any familiar type of steering connections such as radius rods or the like, this lower worm-provided end of the shaft 1 being carried in a suitable bracket 4 which is attached to the main frame. Above the floor 6 at the front of the car is an inclined foot-board 6ª, and to this is bolted the flanged lower end of the tubular post 5 which contains the steering rod 1 and which carries at its upper end a collar 17 from which project arms 23 that carry a stationary sector 22 notched or otherwise configured and across which play the throttle lever 25 and the spark lever 26, said collar 17 also being provided with other arms 27 which support the stationary sector 28 whose edge is notched at 29 and provided with a series of speed graduations which I shall presently more fully explain. The throttle and spark levers 25 and 26 are shown in Fig. 2, but are omitted from Fig. 1 for convenience of illustration.

Surrounding the tubular post 5 and fitting neatly thereover, but loose enough to rotate thereon, is an outer tube 13 having attached to the upper end thereof by means of a set screw or otherwise a collar which is formed integral with the electrical control lever 14 whose outermost end is formed with a projection 30 adapted to engage the notches in the edge 29 of the stationary sector 28, said lever 14 being susceptible of being manipulated back and forth by hand alongside the notched edge 29. The tube 13 has secured thereto at its lower end a gear wheel 15 by means of a set screw 16. This gear wheel 15 engages the teeth of a pinion 18 whose hub is pinned or otherwise attached to a shaft 19 supported revolubly in an inclined position in a bracket 7 which is rigidly attached to the inclined part 6ª of the floor of the car. Fastened to the shaft 19 is also a gear wheel 20 which meshes with a pinion 21 secured by a set-screw 31 or other means to a sleeve 12 belonging to a worm 8, which loosely surrounds the tubular post 5 just below and in contact with the lower end of the outer tube 13. It will thus be seen that the rotary movement of the sleeve 13 will actuate a train of gears 15, 18, 20 and 21, which constitute a multiplying gearing and which will thereby revolve the worm 8 at a speed several times as fast as the revolution of the sleeve 13 or in accordance with whatever the predetermined ratio of the multiplying gearing may be.

Engaging the worm 8 and traveling thereon is an internal worm gear wheel 9 which moves up and down on the worm 8 accordingly as the lever 14 is shifted in one direction or the other. The worm gear wheel 9 has rigidly attached thereto a pair of parallel rods 10 which project downwardly in an inclined direction preferably through openings in the floor section 6ª, and carry at their lower ends circuit closing or contact points 11 which travel in parallel lines over the face of a drum 7 that is rigidly affixed to the steering rod 1 and revolves therewith, said drum 7 carrying a multiplicity of contact points, preferably arranged in two groups, one group for each drive unit, all as clearly indicated in Fig. 1 and also in the enlarged detail plan view of Fig. 4 where the composite construction of the face of the drum 7 is illustrated in full and clear manner.

The drum 7 is provided with an inclosing cylinder securely affixed thereto in any desired manner, the same being of a suitable insulating material, such as hard rubber, or the insulating material may form a cylindrical outer face in one or more pieces for the drum 7. This cylinder carries two groups 24 of contact parts as indicated in Fig. 4. These contact parts consist of a number of parallel curved or circular ribs or webs *a* and groups of blocks *b*. Some of the ribs *a* extend nearly half way around the circumference of the drum 7, but are divided at two points so as to make two separate and independent ribs which are however in circumferential alinement with each other, one such rib section belonging to one of the groups 24 and the other to the other group 24. Three of these long ribs are indicated in Fig. 4. One is marked " C " which connotes charging, the next is marked " S " and connotes starting, and the next is marked " Neutral " indicating that such rib throughout its length provides a neutral zone. Then below the neutral rib there are other ribs, several of which are only part of the length of those marked " C ", " S ", and " Neutral ", and these latter relate to different power speeds, or what are usually known as gear reductions, and are marked 1, 2, 3, 4, 5, 6, 7, 8, 9, 10, to represent these different speeds, 10 being high gear or speed, and 1 being low speed, it being understood that there is no particular virtue in the ten speeds, as there may be any number, though it is desirable that there should be several in order that the different speeds may be properly employed to give the car the needed flexibility. Moreover in circumferential or rectilinear alinement with each of these speed-indicating ribs, I arrange a block or series of blocks *b* having marked thereon a number indicating the speed which it controls, the number of said blocks running from the indicated speed of the contiguous rib, as 10, or 7, for example, down to low speed, as 1, in each case; or to explain this latter point more fully, it will be found by observing Fig. 4 that beyond the end of the high or 10-speed contact rib there is a row of blocks in circumferential alinement therewith which are respectively marked 9, 8, 7, 6, 5, 4, 3, 2, 1, and in circumferential alinement with each of the other speed-indicating ribs there is a similar row of blocks numbered with numbers running down from the speed of each respective rib to low speed and marked accordingly. While I refer to some of these contacts as "ribs," implying thereby more or less length and to some as "blocks," implying thereby a short and possibly narrow form, yet these terms are relative and the contacts may obviously vary greatly in relative shape, size, and location. Also, in each group 24, in the wiring of these parts it will be seen that all the blocks marked 1 (and these are in a line preferably inclined to the direction of the ribs) and which belong, therefore, to low speed, are wired together as shown at C and connected with the low speed rib marked 1; and that all the blocks marked 2, or second speed, are wired together and connected to the rib marked 2, while all the blocks marked 3 for third speed are wired together and connected to the rib marked 3, and so on. This brief description of the contact ribs *a* and blocks *b* belonging to one insulated group 24 applies equally well to the other group 24, except that the arrangement of blocks *b* in the one case is the reverse of the arrangement of the blocks *b* in the other case, so that these two sets of blocks *b* are located opposite to each other while the groups of ribs *a, a* are also located opposite to each other, this being evident from the developed plan of Fig. 4 which shows the groups of contact ribs and blocks spread out in a conventional diagrammatic way, and are, therefore, more clearly understood than when they are conceived of as applied to the face of drum 7 as in Fig. 1, for example.

An electric conductor 32 leads to one of the contact groups 24 and another conductor 33 leads to the other group 24, the conductors 32 and 33 being cables carrying a multiplicity of wires that run to all the thirteen contact ribs *a* shown, of which ten are wired to the inclined rows of contact blocks *b* by conductors *c*, thus establishing a plurality of electric circuits, each of which includes one of the combined generators and motors to be presently explained. Furthermore, it will be understood that the circuit closing contact points 11 play over the faces of the ribs *a* and blocks *b*, one contact 11 working in connection with the members of one group 24, and the other in connection with the members of the other group 24. As the control lever 14 is manipulated back and forth over the sector 28 the described connections with said lever 14 will cause the contact points 11, 11 to ride up and down in lines parallel to the axis of the drum 7, passing, therefore, from one speed to the other accordingly as it is desired to control the speed, the speed numbers on the ribs *a* corresponding to the numbers on edge 29 of sector 28. When the control lever 14 is placed in that notch of series 29, for example, which is marked 1, the contacts 11, 11 will be on the ribs marked 1, while if the control lever 14 is in engagement with the high speed notch at 10 in the sector 28, the contacts 11 will be in contact with the ribs marked 10 in the groups 24, and in making the speed changes of the car, such changes will be brought about by the movement of the lever 14 which results in raising and lowering contact points 11 and passing them across the different contact ribs, it being understood, of course, that the throttle and spark levers are handled in the ordinary way at all times to accelerate or decrease the speed of the car. Furthermore, while the contacts 11 are on the same speed indicating ribs, it must be obvious that the turning of the steering wheel 2 will cause these contacts 11 to travel back and forth in a curved path in the same plane on the ribs *a* and blocks *b*, such travel carrying one of the contacts 11 toward and on to the blocks *b* and at the same time the other contact 11 away from the other group of blocks *b*.

When the machine is driving straight ahead or deflecting only slightly from a straight forward or reverse movement both contacts 11 will be on the ribs *a* of the same speed, but in changing the direction of travel by rotating steering wheel 2 by hand in the usual manner, as soon as a turn more or less is made, as on a curve, one of the contacts 11 will pass from a high speed rib *a*, as that marked 10 for example, on which it is sliding, to the next adjacent block in group *b*, as for instance block 9, then to the next, as block 8, etc. while the other contact 11 still slides along on its speed rib 10, thus showing that while one of the driving wheels will keep up to the same speed as before, the other will reduce its speed in making the turn when it begins driving on what is commonly called a lower gear, though in each case the drive will be positive and reliable and will propel the car surely and effectively. When the machine straightens out again and runs once more on a rectilineal forward or back line, the contact 11 which has been on some one of the lower speeds will return to the former higher speed and continue thereon as before until another turn in steering takes place. The contacts 11 have attached thereto suitable electrical conductors 50 and 51, insulated as shown, which lead to the generators and complete the circuits with the wires 32 and 33 through the different speeds. Thus one set of the circuits for one drive unit will be through one of the conductors in cable 32, one of the contact groups 24, and circuit closer 11 working with said group, one of the generators and motors 34, and back through the wire 50, while the other set of circuits to the other generator and motor 34 of the other driving unit will be through one of the wires in cable 33, the group 24 with which it is connected, the other contact 11, and the other wire 51. The wiring for the circuits whereby the different speeds are attained is not set forth in detail as it is not necessary in the explanation of the arrangement of the electrical and mechanical parts, since such wiring will be evident to any electrician conversant with the object to be secured.

Referring to Fig. 5 I have delineated in diagrammatic form the arrangement of the various parts whereby a separate control of the drive wheels of an automobile or other vehicle is secured by the use of the control appliances which I have just been describing. In this general arrangement of mechanical elements there are two parallel main engine shafts 48 which are driven by two engines or motors of any kind. Preferably they may be internal combustion engines 36. The forward ends of these engine shafts 48, in front of the gas engines 36, are provided with intermeshing gears 46 and 47 to cause them to operate in unison, (though in opposite directions) while suitable universal joints 37 are interposed in the length of the shafts 48 in order to permit them to change their direction behind the gas engines as may be required to suit the exigencies of different kind of gas engine and automobile practice. In line with the parallel main propelling shafts 48, are generators and motors 34 so that the generators may be driven by shafts 48, and the motors having the shafts 35 rectilinearly alined with the shafts 48 and provided with universal joints 38 and 39 as may be needed at suitable points, there being on the rear ends of the shafts 35 pairs of pinions 40 and 49 that mesh with gear wheels 41 on the drive shafts 42 located at right angles to the motor shafts 35 and suitably supported in a casing or housing 45 and carrying drive wheels not shown. Arranged in conjunction with the pinions 40 and 49 at each side of housing 45 are clutches 43, which can be shifted, so as to connect the shafts 35 either with the pinions 49 or the pinions 40, and thus drive the shafts 42 in one direction or the other, as may be preferred, the operation of these clutches 43 being effected through a clutch operating member 44 suitably supported and arranged within the housing 45 and operated by suitable leverage connections indicated in Fig. 5 and including the link 52 and the lever 53.

It is not thought necessary to describe in detail the generators and motors 34, as they are well known elements in driving automobiles and similar vehicles. It may be sufficient to remark that the shafts 48 are driven at the proper rate of speed by means of the gas engines 36 with the result that the electric motors whose armatures are on the shafts 35 are suitably energized to actuate the shafts 35 at the proper rate of speed, and are magnetically connected to the generating mechanism on end of shafts 48 so that at high speed or on high gear the engine shafts 48 will be so magnetically clutched to the shafts 35 that they will be revolved at the same rate of speed as said engine shafts 48. When, however, the car is running at anything below high speed, that is to say, in any one of the great variety of lower speeds, the armature on the end of the propeller shafts 35 slips within the clutch, so that the drive takes place through a slipping clutch, which slip generates electricity that is carried into the motors on the propeller shafts 35 to actuate said shafts and drive the car at any one of its innumerable speeds, the device being one of great flexibility and effectiveness, but the details of which it is not necessary for me to set forth here more fully as they are exemplified in a number of different forms so far as a single driving unit is concerned, but the idea of a twin electric drive with unitary control is broadly novel with me.

I have depicted in Fig. 5 a brake mechanism by means of which the brakes may be applied independently to the wheels carried by the axle shafts 42 (or to the shafts), these brakes and their connections being shown diagrammatically as are the other parts in this figure. At each side of the steering wheel 2 is a double or split pedal consisting of two parts, the split pedal on the left side being generally designed for use with the left foot and on the other with the right foot. The pedal at the left of the steering wheel consists of the parts 61 and 61ᵃ and are for the left foot, while at the right side of the wheel 2 is another split pedal having parts 68 and 68ᵃ for the right foot, there being thus two brakes each having a section for the left wheel and for the right wheel. Of course, if it is only desired to use one of these pairs of brakes, the two parts 61 and 61ᵃ of one of the pedals might be operated with the two feet, but usually parts 61 or 61ᵃ will be operated by the left foot and parts 68 or 68ᵃ will be operated by the right foot, while if it is desired to use the full braking power of both pairs of brakes, the left foot can operate both pedals 61 and 61ᵃ and the right foot both pedals 68 and 68ᵃ. The pedal 61 actuates a link 62 that connects by a crank arm 63 with the transverse shaft 64 having a crank arm 65 connecting by a link 66 with a shaft 67 arranged in connection with a brake for the left drive wheel in any suitable way. The companion pedal 61ᵃ connects by a link 62ᵃ with the crank arm 63ᵃ on the transverse shaft 64ᵃ having a crank arm 65ᵃ communicating through a link 66ᵃ with a transverse brake shaft 67ᵃ carrying another wheel brake that operates on the right drive wheel. The pedal 68 actuates a longitudinal link 69 connecting with a crank 70 on a transverse shaft 71 that operates a crank arm 72 pivoted to a link 73 that operates the brake shaft 74 of a wheel brake for the left drive wheel; and also the pedal 68ᵃ actuates a link 69ᵃ which is attached to a crank arm 70ᵃ on the shaft 71ᵃ having a crank 72ᵃ pivoted to a link 73ᵃ which actuates a brake shaft 74ᵃ arranged in connection with another brake for the right drive wheel. Further, the emergency brake has a lever 75 that operates a link 76 connected to a crank arm 77 by means of which both transverse shafts 71 and 71ᵃ are simultaneous actuated for the purpose of setting or releasing the wheel brakes which are connected therewith through the levers and links already described. I have also referred to the lever 53 connected to the clutch shifting member 44 by means of the link 52 which makes it possible to shift the clutches 43 back and forth in reversing the main or propeller shafts. In Fig. 6 I have indicated a modification of the clutch shifting device, which modification consists of independent parts for moving the clutches 43 separately instead of together as in Fig. 5. These independent parts have the members 44ᵃ having extensions 78 to which are connected operating links 79, and thus the clutches 43 can be moved independently in order to permit the shafts 42 to be driven in the same or opposite directions.

In Fig. 7 I have indicated the same general arrangement of parts in a case where gasolene engines are not employed, but instead thereof are two electric motors 54 receiving their power from storage batteries or otherwise, in other words, I show here the application of my twin driving mechanism to an electric car. The motors 54 through the universal joints 56 impart motion to the propeller shafts 55 which may or may not be provided at a certain point in their length with universal joints 57, on which shafts are bevel pinions 58 engaging bevel gear wheels 60 on the inner ends of axle shafts 59 that carry the drive wheels. Through the same control mechanism arranged in conjunction with the steering wheel 2 or otherwise, as I have already explained, I am enabled to separately control the electric motors 54 and drive the propeller shafts 55 in one direction or the other, a reversal of these shafts being easily made at any time by reversing the motors, and also I drive the motors at varying speeds. A system of braking appliances is delineated in this figure similar to that shown in Fig. 5 consisting of two sets of brakes, each one having duplicate or split pedals. One of the split pedals consists of the members 80 and 80ᵃ at one side of the steering wheel 2, and the other of the other pedal members 87 and 87ᵃ at the right of the steering wheel 2. The pedal 80 connects by a link 81 with a crank arm 82 on the shaft 83 that carries a crank arm 84 connected by a link 85 with a brake shaft 86 whose braking devices apply their power to the left drive wheel, which is on one of the shafts 59. The other member 80ᵃ of this split pedal connects through a similar leverage with a braking device for the other rear driving wheel. The member 87 of the other split pedal operates a link 88 attached to a crank arm 89 on a transverse shaft 90 having an arm 91 connecting through a link 92 with a brake shaft 93 whose braking devices operate in connection with one of the rear wheels, while the other member 87ᵃ of this split pedal connects through a similar system of leverage with the braking appliances for the right driving wheel on the other shaft 59. Thus the two braking systems may be employed together or separately; when together, the split sections 80 and 80ᵃ being actuated by the left foot, and the sections 87 and 87ᵃ by the right foot, and when separately, one foot operating either the pedal 80 or 80ᵃ and the other foot either the pedal 87 or 87ᵃ; also the emergency function of the braking system is availed of through the medium of a lever 94 connected by a link 95 with an arm 96 which controls the braking devices for both wheels in the usual way.

In Fig. 8 I have shown another case for the use of my improved twin drive and control, where there is an engine, preferably gasolene, though it may be any other kind, but only one, instead of two as in the example given in Fig. 5, said internal combustion or other engine 97 being geared up with two shafts so that the proper results in the revolution of the shafts is attained, that is to say, the crank shaft of the engine 97 has attached thereto an intermediate gear wheel 98 which will be revolved in the clockwise direction shown by the arrow, and this gear 98 meshes with a gear 99 at one side on a shaft 102, and on the other side with a gear 100 on another parallel shaft 102, the two shafts 102 being the main drive shafts, and being revolved by the gear wheels in the same direction as shown by the arrows in Fig. 9, such shafts 102 having preferably universal joints 101 in order to allow them to extend in the proper direction. Electric generators and motors 103 similar to generators and motors 34 in Fig. 5 are herein shown, as are also two propeller shafts 106 parallel to each other, having near the electric generators universal joints 104 and near the rear axle universal joints 105, said propeller shafts 106 each carrying bevel pinions 107 and 108 which mesh with bevel gear wheels 109 on axle shafts 110. There are also clutches 111 which engage either the pinions 107 or the pinions 108 for the purpose of reversing the motion of the axle shafts 110 in any desired way, said clutches 111 being operated by the member 112 controlled by a single link 113, as shown in Fig. 8, or a pair of links 113 and 114, as shown in Fig. 11, controlling a pair of levers 112ᵃ and 112ᵇ which link or links 113 and 114 run forward to a point near the steering wheel where an operating lever or levers 115 is provided for their use. The clutches 111 are operated by member 112 which is pivoted at the center so that its arms will occupy a diagonal position when it simultaneously places one clutch 111 in engagement with one pinion 107 and the other clutch in engagement with the pinion 108 on the other side, this diagonal position being necessary as shafts 106 rotate in the same direction. It will be observed moreover that I employ in connection with the parts shown in this figure the same or similar split pedal double-set braking appliances set forth in Figs. 5 and 7, the same consisting of split pedals 116 and 116ᵃ at the left of the steering wheel and split pedals 117 and 117ᵃ at the right of the steering wheel, which through suitable levers, which need not be further described here as they have been set forth in detail in connection with Figs. 5 and 7, operate braking appliances for the rear drive wheels and can be actuated either jointly or separately by one or both feet so as to give ordinary braking service or extraordinary power in emergency cases. I also indicate an emergency brake lever 118, which through a suitable system of leverage controls the brakes under special conditions. In Figs. 8 and 9 I have shown, as already stated, the intermediate gear wheel 98 which drives the gears 99 and 100 on the two parallel shafts 102 in the same direction. There are cases where it may be desirable to drive the shafts 106 in the same direction, but a direction opposite to which they are driven by a gear wheel, as 98, carried on the crank shaft of an ordinary internal combustion engine, which single shaft obviously revolves clockwise. In Fig. 10 I have shown means for enabling the gas engine 97 to drive the said parallel shafts 106 in this opposite direction, said means consisting of a sprocket wheel 119 on the crank shaft of the engine. A chain 120 passes around the sprocket wheel 119 and also around a sprocket wheel 121, which may be attached to the left hand shaft 102, and a sprocket wheel 122 which may be carried on the right hand shaft 102; this system of sprocket wheels and chains thereby giving, as indicated by the arrows in Fig. 10, a direction of motion to the two shafts 102, and likewise to the two shafts 106, which is the reverse of that given to them by the gearing shown in Fig. 9.

As I have already herein set forth, the motion of the parallel twin propeller shafts, by means of which the rear wheels or the drive wheels are actuated, is controlled independently by means of a single lever, as 14. This single lever, therefore, controls the speed of the motors and the drive wheels, and enables them to both operate at the same rate of speed when going forward, or back, in a straight line, or at different rates of speed, accordingly as the steering wheel is turned to the right or left for the purpose of guiding the car along lines deflecting from a straight line, as in bends or curves of greater or less length and acuteness. Thus when the steering wheel is turned to the right, the effect would be to reduce the speed of the right wheel while leaving the left wheel to continue with the speed indicated by the control lever, as 3, 4, 8, 10, etc., whichever it happens to be. Suppose that a sharp corner is being turned, the control lever might then reduce the speed of the car down as low as speed 4 before making the turn, and then the turning of the steering wheel would cause the left wheel to continue at speed 4, while the right wheel might diminish its speed to 1 or even zero speed if turning a right hand corner, or a reverse operation of the wheels would occur if the turn were made around a left corner. I desire to emphasize, however, the fact that the steering in this manner may be done with a steering mechanism as ordinarily constructed which connects with the worm gear on the lower end of the steering rod, in which case the steering is much more easily effected, since the different speeds at which the two rear wheels are driven cause the front wheels to automatically deflect in the right direction. Or such steering mechanism at the lower end of the steering rod may be entirely omitted and the car steered alone by the independent operation of the two motors driving the rear wheels or drive wheels positively but at different speeds in the making of turns, without having any movement imparted by the steering apparatus to the front wheels themselves, since these front wheels will be deflected from one direction to the other under the action of the rear wheels in the way I have explained. This is entirely possible and practicable provided the front wheels are so built and hung on the axle that they will swing around truly and easily in a manner similar to a caster or otherwise so that they will be completely under the control of and guided by the mechanism which pushes them forward. This is a very great improvement in steering inasmuch as all danger from the breaking of the steering devices or some disarrangement in the parts thereof which might cause serious trouble is obviated, and the construction and operation of the car is greatly simplified. Of course, when the steering connections attached to the front wheels are employed, the operation is the same as in the other case and vice versa. Even if there are no such steering connections it might be desirable to retain the steering wheel in order that the apparent operation of driving the car might be similar to what it is at present, though it is conceivable that a plan may be arranged whereby the steering post and accompanying parts can be entirely replaced by other similar and more convenient devices. In the present arrangement of the invention as herein portrayed and described I show the control lever arranged in conjunction with the steering wheel, as also the throttle and spark levers, but they might be differently arranged, and I do not wish to be restricted thereto. Furthermore although the steering wheel is connected with devices operating upon a drum located somewhere in convenient proximity to the floor of the car for the functioning of the duplicate contacts in connection with the opening and closing of the circuits for the two generators and motors in driving the opposite sides of the car at different speeds, yet this drum may be differently constructed and arranged, and may be placed in an entirely different position, and the electrical circuits, contacts, and other features may be modified within wide limits, providing the essential feature is retained of driving the two propeller shafts at varying speeds by manipulations of a single control lever whereby the members of the pair of drive wheels are driven at the same or varying speeds so as to not only propel the car forward or back but also guide it wherever desired. In those cases where steering connections between steering posts and the front wheels are employed it will be found that the electric controlling mechanism for the duplicate shafts will assist greatly in the steering.

The operation of my twin drive will be readily understood from the foregoing description of the construction and arrangement of the various parts and it is unnecessary to recapitulate the same on this point at any length. By the simple manipulation of the control lever the duplicate generators and motors are controlled so as to provide the driving power at any one of the desired speeds, revolving the drive wheels at the same or different speeds in the way I have already pointed out. Of course, it will be understood that the speed of the internal combustion engines is controlled by the throttle in the usual way, one throttle lever in Fig. 5 controlling suitable carbureting apparatus for both engines, as shown at 124, which apparatus may consist of one or more carbureters constructed and arranged as preferred, but by the manipulation of the throttle lever in supplying or cutting down the gas the speed of the engine or engines and the consequent speed of the car will be increased or diminished in the well-known manner on whichever one of the power speeds the electrical motors may be functioning. With reference to the steering it should be remarked that the braking system, either single or double, that is to say, lighter or heavier power may be utilized for steering at a time when the electrical control devices are running with an unchanged power effect, such steering being accomplished by merely operating the split pedal with the left foot for checking the speed of the left wheel, or with the right foot for checking the speed of the right wheel, thus causing the machine to steer to the left or to the right without the aid of any steering devices whatsoever and without utilizing the variable speed of the engines for steering purposes, so that not only, as I have already set forth, can the steering be accomplished if desired by omitting steering mechanism and using simply the electrical control and thus imparting different speeds to the separate motors, but also this method of steering by the brakes alone can be adopted; and in a case where the car is coasting down a hill with all power shut off and the electrical control in neutral position at a time when it could not be steered by varying the relative speed of the motors and in the absence of steering apparatus it will be necessary to employ the brakes for steering in the manner I have just specified. Ordinarily, however, in any long coasting with the engine running at low speed and the generator and motor connected up to one of the electric speeds, any acceleration of the car would be magnetically braked, and in this case the steering might be effected by turning the steering wheel to right or left. Thus by means of twin propellers or propelling shafts which are suitably geared to the axle shafts, or the shafts to which the drive wheels are attached, in combination with jointly-controlled variable speed electric motors, I am enabled to secure a very large number of advantages not hitherto attainable by existing devices, mechanisms, and combinations, especially in that I am able to positively actuate the driving members at the same or different speeds so that there may be an effective traction on the surface over which the car is moving, and a sure and accurate turning of the automobile on a curve or deflection from a right line. Obviously this result is aided largely by the rear axle combination where I employ duplicate short axle shafts, one for each wheel, which shafts are geared to the longitudinal twin propeller shafts which are directly driven by the electric motors, said gearing connections being controlled by the devices shown so that the drive wheels may be rotated in a forward or in a reverse direction, but this special combination of intergeared axle shafts and longitudinal drive shafts is described and claimed in my copending application for patent on twin shaft driving mechanism for automobiles and other vehicles filed March 10, 1916, Serial No. 83,341, which has since matured into Patent 1,251,341 of January 1, 1918.

Many changes in the various details in which the invention is embodied may be made without exceeding the scope of the same as herein outlined, and I, therefore, reserve the liberty of modifying the invention to adapt it to innumerable other cases to enable it to serve for various purposes not herein specifically stated, and broaden out the scope of application of the same as far as may be possible within the limits of the appended claims.

Having thus described my invention, what I claim as new and desire to secure by Letters Patent, is:—

1. In a mechanism of the class described, the combination of a pair of parallel main shafts, electric motors for separately actuating said shafts, means for generating electricity to drive said electric motors through a slipping clutch, there being one of these means for each electric motor, one or more motors for driving said generating means, and means for jointly controlling the operation of said electric motors so that they may run at the same or at different speeds.

2. In a mechanism of the class described, the combination of a pair of parallel main shafts, electric generators and motors for separately actuating said shafts, and means for jointly controlling the operation so that the shafts may run at the same or different speeds, said control device consisting essentially for each motor of a group of insulated contact pieces in a plurality of electric circuits including the motor and providing for a series of different speeds, and circuit closers operating with the said contact pieces.

3. In a mechanism of the class described, the combination of a pair of parallel main shafts, electric generators and motors for separately actuating said shafts, a control device for the electric motors consisting essentially for each motor of a group of insulated contact pieces in a plurality of electric circuits including the motor and providing for a series of different speeds, there being two groups of said insulated contact pieces, circuit closers operating in connection with said contact pieces, one for each group, and means for jointly actuating the circuit closers, the same being arranged so that in certain positions of the circuit closers there shall be such circuits closed as will cause one shaft to run at a higher speed and the other shaft to run at a lower speed.

4. In mechanism of the class described, the combination of a pair of driven shafts, independent electric motors for respectively driving the said shafts, and joint control mechanism for both said motors, having parts relatively movable along one path to effect simultaneous and equal changes in the speeds at which the motors drive, and relatively movable along a different path to effect relative changes of speeds between the motors to cause differential drive of the shafts.

5. In mechanism of the class described, the combination of a pair of driven shafts, independent electric motors for respectively driving the said shafts, and joint control mechanism for both said motors, having two groups of contacts, one for each motor, and independent contacts simultaneously movable relative to the contacts of the said groups for coöperating therewith, they being movable relative to the groups of contacts along certain paths to effect simultaneous and equal changes in the speeds at which the motors are driven, and along other paths to effect relative changes of speeds between the motors.

6. In a drive mechanism for motor vehicles, the combination of a pair of driven shafts connected with the drive wheels on the opposite sides of the vehicle, independent electric motors for driving the said shafts, and a joint control mechanism for both the motors, having means arranged to be conveniently operated by the driver of the vehicle for moving the parts of the controlling mechanism in one path to effect simultaneous and equal changes in the speeds at which the motors drive, and also means to be conveniently operated by the driver for effecting movements of the parts of the control mechanisms along different paths to effect relative changes of speeds between the motors.

7. In a drive mechanism for motor vehicles, the combination of a pair of driven shafts connected respectively with the drive means on the opposite sides of the vehicle, independent electric motors for driving the said shafts, and joint control mechanism for the motors, comprising a drum carrying two sets of contacts in electric connection respectively with the motors, a pair of movable contacts for engaging with the contacts of the said groups, manually controlled means for moving the pair of contacts in the direction of the length of the drum, and other manually controlled means for rotating the drum, one set of said movements being arranged to effect simultaneous and equal changes of speed in the rotation of the motors and the other movements changes in the relative speeds at which the motors rotate.

8. In a drive mechanism for motor vehicles, the combination with the drive wheels, steering wheels, and manually controlled means for turning the steering wheels, of a pair of independent shafts each connected with one of the drive wheels, independent electric motors for respectively driving the said shafts and a joint control mechanism for both of the motors, comprising a drum supported by and turning with the manually controlled means for operating the steering wheels, two sets of change speed contacts upon the said drum the contacts of the sets connected respectively with the motors, a pair of movable contacts for engaging respectively the contacts in the groups on the drum, and manually controlled means for simultaneously moving the said pair of contacts arranged conveniently with reference to the manually controlled steering means, the movement of the pair of contacts with reference to the change speed contacts being adapted to effect simultaneous and equal changes in the speeds at which the motors drive, and the movements of the drum carrying the groups of contacts when the steering wheels are turned effecting relative changes of speeds at which the motors drive.

9. In a mechanism of the class described, the combination of a pair of parallel main shafts, electric generators and motors for separately actuating said shafts, a control device for jointly controlling the operation so that the shafts may run at the same or different speeds, said control device consisting essentially for each motor of a group of insulated contact pieces in a plurality of electric circuits including the motor and providing for a series of speeds, circuit closers operating with the said contact pieces, means for jointly moving said circuit closers so that they may travel across the groups of contact pieces in one direction, and means for causing the circuit closers to pass across the groups of contacts in another direction at right angles.

10. In a mechanism of the class described, the combination of a pair of parallel shafts, electric generators and motors for separately actuating said shafts, means for driving the electric generators, means for jointly controlling the operation of the motors so that the shafts may run at the same or different speeds, said control device consisting essentially for each motor of a group of insulated contact pieces in a plurality of electric circuits including the motor and providing for a series of different speeds, circuit closers, means for causing said circuit closers to move in parallel lines across the separate groups of contact pieces in varying the speed, means for also causing the circuit closers to move at right-angles to the first mentioned direction across the said contact pieces to cause the speed of one shaft to be kept constant while the speed of the other shaft is changing.

11. In a mechanism of the class described, the combination of a pair of parallel main shafts, electric generators and motors for separately actuating said shafts, means for jointly controlling the operation so that the shafts may run at the same or different speeds, said control device consisting essentially for each motor of a group of insulated contact pieces, in a plurality of electric circuits including the motor and providing for a series of different speeds, circuit closers, means for jointly moving said circuit closers along parallel paths over the separate groups of contact pieces for the purpose of varying the speed of the shafts while keeping the speed of both the same, means for jointly moving the circuit closers in a direction at right angles to the first mentioned direction over the said contact pieces for the purpose of keeping the speed of one shaft constant while the speed of the other varies, a lever and its connections with said circuit closers for making the first of the said movements, and a rotary member connected with said circuit closers for making the second of said movements.

12. In a mechanism of the class described, the combination of a pair of parallel main shafts, electric generators and motors for separately actuating said shafts, means for jointly controlling the operation so that the shafts may run at the same or different speeds, said control device consisting essentially for each motor of a group of insulated contact pieces in a plurality of electric circuits including the motor and providing for a series of different speeds, circuit closers, means for jointly moving said circuit closers along parallel paths over the separate groups of contact pieces for the purpose of varying the speed of the shafts but keeping the speed of both the same, means for jointly moving the circuit closers in a direction at right angles to the first-mentioned direction over the said contact pieces for the purpose of keeping the speed of one shaft constant while the speed of the other varies, a single lever connected with said circuit closers for making the first of said movements, and a support on which the said single lever is carried for the purpose of making the second of said movements.

13. In a mechanism of the class described, the combination of a pair of parallel main shafts, electric generators and motors for separately actuating said shafts, a control device for jointly controlling the operation so that the shafts may run at the same or different speeds, said control device consisting essentially for each motor of a group of parallel contacts and at the end of each contact a series of relatively smaller contacts so that each contact rib and its contiguous series of smaller contacts will give a decreasing series of speeds, said arrangement of contact pieces being for each motor and being in a plurality of electric circuits including the motors so that each motor may have a series of different speeds, circuit closers, means for moving said circuit closers parallel to each other over the different series of contacts, and means for moving the circuit closers at right angles to said first movement over the contacts and also the contiguous series of diminishing speed contacts.

14. In a mechanism of the class described, the combination of a pair of parallel main shafts, electric generators and motors for separately actuating said shafts, a control device for jointly controlling the operation so that the shafts may run at the same or different speeds, said control device consisting essentially for each motor of a group of insulated contact pieces comprising a series of parallel ribs and at the ends of these ribs above the lowest speed rib a series of blocks which will give speeds diminishing from the speed of the rib to the lowest speed, all of said contact ribs and blocks being connected in a plurality of electric circuits, there being a group of these circuits for each motor and all including the motor and providing for a series of different speeds, circuit closers, means for causing them to travel in parallel lines across the edges of the ribs in changing the speed of the shafts from a higher to a lower gear, said means including a control lever and means for suitably supporting the same, and means for causing the circuit closers to travel in the same plane across the edges of the different groups of contact ribs and blocks in keeping the speed of one shaft uniform while the speed of the other increases or diminishes, said means including a rotary steering wheel and a column on which it is supported.

15. In a mechanism of the class described, the combination of a pair of parallel main shafts, electric generators and motors for separately actuating said shafts, a control device for jointly controlling the operation so that the shafts may run at the same or different speeds, said control device consisting essentially for each motor of a group of insulated contact pieces comprising a series of parallel ribs and at the ends of these ribs above the lowest speed rib a series of blocks which will give speeds diminishing from the speed of the rib to the lowest speed, all of said contact ribs and blocks being connected in a plurality of electric circuits, there being a group of these circuits for each motor, and all including the motor and providing for a series of different speeds, all of said contact ribs and blocks being carried on a cylindrical drum having means for insulating them from the drum and from each other, circuit closers, means for causing them to travel in parallel lines across the edges of the ribs in changing the general speed of the shafts from a higher to a lower gear, said means including a control lever and means for suitably supporting the same, and means for causing the circuit closers to travel in the same plane across the edges of the different groups of contact ribs and blocks in keeping the speed of one shaft uniform while the speed of the other increases or diminishes, said means including a rotary steering wheel and a column on which it is supported, to which said drum is connected.

16. In an automobile or other vehicle, the combination of twin main horizontal shafts, electric generators and motors for driving the same with a slipping clutch, a control device for jointly and separately controlling the operation of such motors so that the shafts can be operated at the same or different speeds, a pair of internal combustion engines for actuating the generators, a control device whereby the said engines are throttled in the same manner, and duplicate braking appliances for the opposite sides of the automobile so that the drive wheels may be affected by the brakes at the same or different times.

17. In an automobile or similar vehicle, the combination of a pair of twin main shafts, electric generators and motors for independently actuating them, means for jointly and separately controlling the operation of said motors consisting essentially of contact groups, one for each motor arranged in a plurality of circuits including the motors, circuit closers, together with means for simultaneously operating them, a steering mechanism including a steering wheel, and braking appliances for the separate shafts, said braking appliances having their operating members localized with reference to the steering wheel.

In testimony whereof I affix my signature.

WILLIAM J. P. MOORE.